United States Patent [19]
Bey

[11] Patent Number: 5,509,446
[45] Date of Patent: Apr. 23, 1996

[54] BALL VALVE OR PLUG VALVE PROVIDED WITH AN INSERT

[75] Inventor: Roger Bey, Illzach, France

[73] Assignee: Rotatrol AG, Cham, Switzerland

[21] Appl. No.: 443,396

[22] PCT Filed: Jul. 2, 1993

[86] PCT No.: PCT/FR93/00673

§ 371 Date: Jun. 22, 1994

§ 102(e) Date: Jun. 22, 1994

[87] PCT Pub. No.: WO94/01703

PCT Pub. Date: Jan. 20, 1994

Related U.S. Application Data

[63] Continuation of Ser. No. 204,200, Jun. 22, 1994, abandoned.

[30] Foreign Application Priority Data

Jul. 3, 1992 [FR] France ................................. 92 08412

[51] Int. Cl.⁶ ............................................. F16K 47/04
[52] U.S. Cl. ............................... 137/625.32; 251/127
[58] Field of Search ................. 137/625.32; 251/127

[56] References Cited

U.S. PATENT DOCUMENTS

| | | |
|---|---|---|
| 4,212,321 | 7/1980 | Hulsey ............................... 137/625.32 |
| 4,479,510 | 10/1984 | Bey . |
| 4,530,375 | 7/1985 | Bey . |
| 4,610,273 | 9/1986 | Bey . |
| 5,070,909 | 12/1991 | Davenport ........................... 137/625.32 |
| 5,193,583 | 3/1993 | Gethmann et al. . |

FOREIGN PATENT DOCUMENTS

| | | |
|---|---|---|
| 0325846 | 8/1989 | European Pat. Off. . |
| 2506420 | 11/1982 | France . |
| 8805880 | 8/1988 | WIPO . |

Primary Examiner—John C. Fox
Attorney, Agent, or Firm—Oblon, Spivak, McClelland, Maier & Neustadt

[57] ABSTRACT

The invention concerns a ball or plug valve for dividing differential pressure into several stages during opening or closing operation of the valve.

The valve (1) comprises a body (2) defining a housing (2') for a movable member (3) consisting of a ball (4) or plug (5), and provided with a substantially cylindrical channel (6). The said valve (1) comprises a substantially cylindrical tubular insert (10) received in the said channel (6) and defining at least one inlet chamber (11) and at least one outlet chamber (12). These chambers are diametrically opposite and consist of two longitudinal recesses (13) formed in the wall of the insert (10) parallel to the longitudinal axis (14) of the channel (6). The chambers (11) and (12) communicate via two or more resistords (15) in two cylindrical sectors defined by the said chambers at the periphery of the insert.

28 Claims, 3 Drawing Sheets ered in the said channel and defined at least one input chamber and at least one outlet chamber, these chambers being diametrically opposite and consisting of two longitudinal recesses formed in the wall of the insert parallel to the the longitudinal axis of the
BALL VALVE OR PLUG VALVE PROVIDED WITH AN INSERT This application is a Continuation of application Ser. No. 08/204,200, filed on Jun. 22, 1994, now abandoned which was filed as PCT application PCT/FR93/00673 on Jul. 2, 1993.

BACKGROUND OF THE INVENTION

1. Field of the Invention

The present invention relates to a ball valve or a plug valve comprising a body defining a housing for a movable member consisting of a ball or a plug, this movable member being provided with a substantially cylindrical channel arranged to be brought into line with the continuation of an inlet conduit or outlet conduit when the valve is open, and in a direction which is substantially perpendicular to the axis of the inlet and outlet conduits when the valve is closed.

2. Discussion of Background

At present, ball valves of the known type are- subjected to considerable seat erosion due to the differential pressures which occur during the valve opening or during the valve closing. Due to these differential pressures, the potential energy is converted into kinetic energy which generates local velocity increase of flow at small opening, which is the primary source of erosion and turbulence. These differential pressures also cause vibrations inside the valve which increase the noise level and mechanical fatigue. As soon as the seals are damaged, the said valve can no longer be said to be tight.

The ball valve described in the French patent application FR-A-2 506 420 attempts to propose a solution to overcome the problems outlined above. With this in mind, the ball comprises two turbulence attenuators located in the areas of turbulence which form when the valve is opened and closed. These turbulence attenuators are comprised of stepped and perforated walls. In practice, this solution is not entirely satisfactory for the following reasons:

The attenuators are located in the ball's sealing area in such a way that the pressure reduction and the conversion of energy affect the seat's performance.

The ball can not be closed at an angle of 0°, but at a negative angle, which is proscribed for regulating control servomotors.

The pressure reduction obtained with this valve is insufficient given the size of the attenuators.

Furthermore, the standard valves industry can not make use of this invention as it implies a costly and bulky oversizing of the ball.

SUMMARY OF THE INVENTION

This invention proposes to overcome the above-mentioned drawbacks by providing a ball or plug valve for dividing differential pressure into several stages when it is opened or closed. As this pressure is staggered, it is reduced gradually and thus prevents pressure recovery and therefore an increase in velocity.

This aim is achieved by a valve as defined in the introduction, characterized in that it comprises a tubular insert which is substantially cylindrical received in the said channel and defined at least one input chamber and at least one outlet chamber, these chambers being diametrically opposite and consisting of two longitudinal recesses formed in the wall of the insert parallel to the the longitudinal axis of the channel, and in that these chambers communicate via at least two resistors in the two cylindrical sectors defined by the said chambers at the periphery of the insert.

The said resistors are preferably made up of several longitudinal grooves connected to one another, either by transversal orifices running through ribs separating these grooves, or by transversal slots at the periphery of the said cylindrical sectors.

According to a preferred form of arrangement, the inlet chamber is open on the insert's inlet side and closed or partially closed on the outlet side of the said insert, and the outlet chamber is closed or partially closed on the insert's inlet side and open on the said insert's outlet side.

In the preferred form of arrangement, the recess is open and each chamber is defined outwards by a sector of the channel's internal wall through the ball or the plug and an end collar. This open recess can be defined by a longitudinal flat part or a cylindrical surface at the periphery of the insert.

According to one alternative arrangement, the recess is closed outwards and the chamber is comprised of a blind cavity formed in the wall of the insert.

The end collar can have the advantage of having conduits running axially through this collar and arranged to evacuate the impurities which might have accumulated, when the valve is in the open position.

In the preferred form of arrangement, the insert has a substantially cylindrical middle channel with the diameter of this channel able to be less than or equal to the diameter of the inlet and outlet conduits.

The present invention and its advantages will be better understood in the following description of an example of how it is implemented, with reference to the attached drawings, in which:

DETAILED DESCRIPTION OF THE PREFERRED EMBODIMENTS

Figure 1:
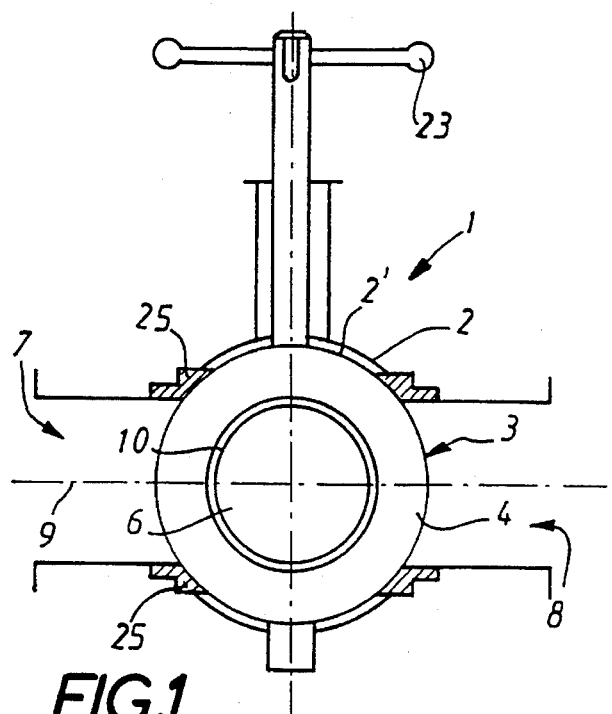
FIG. 1 is a schematic view of a ball valve according to the invention.
Figure 2:
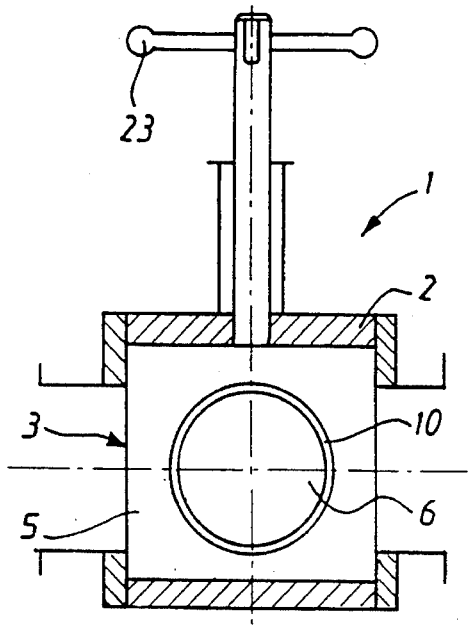
FIG. 2 is a schematic view of a plug valve according to the invention.
Figure 3:
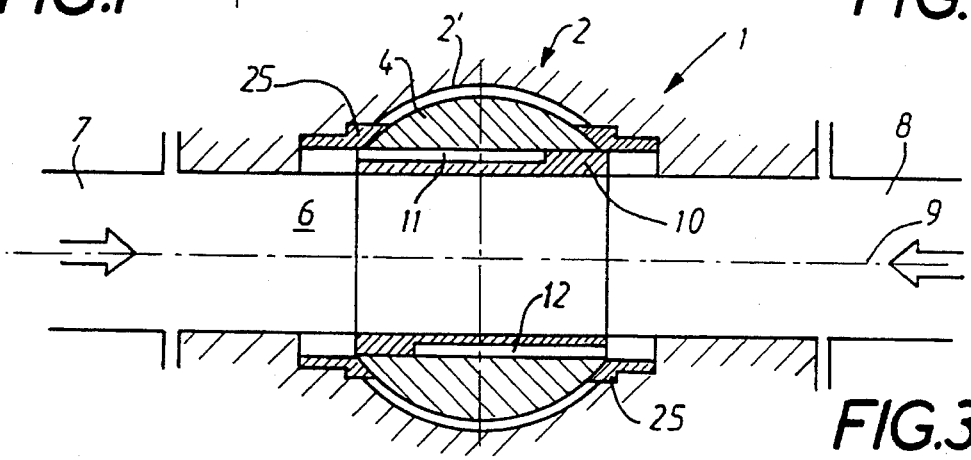
FIG. 3 is a longitudinal cutaway view of a first form of arrangement of a ball valve according to the invention in the open position.

With reference to the figures, the valve 1 comprises a body 2 defining a housing 2' for a movable member 3 consisting of a ball 4 or a plug 5. This housing 2' is provided with two seats 25 ensuring tightness with the movable member 3. This movable member 3 is provided with a substantially cylindrical channel 6 arranged to be brought into line with the continuation of a inlet conduit 7 or outlet conduit 8 when the valve is open, and in a direction which is substantially perpendicular to the axis 9 of the inlet and outlet conduits when the valve is closed. Opening and closing the valve shown by FIGS. 1 and 2 is for example controlled by a control handwheel 23, which can be replaced by an electrical actuator or by a hydraulic or pneumatic operator, according to how the valve is used or the installation in which it is fitted.

The valve 1 comprises a substantially cylindrical tubular insert 10 which is forced or fixed with appropriate fasteners into the channel 6.

This insert defines with the internal wall of the channel 6 at least one inlet chamber 11 and at least one outlet chamber 12 which are diametrically opposite and consist of two longitudinal recesses 13 formed in the wall of the insert 10 parallel to the longitudinal axis 14 of the channel 6. These chambers 11 and 12 communicate via two or more resistors 1S in two cylindrical sectors defined by the said chambers 11 and 12 at the periphery of the insert 10.

The purpose of these resistors is to create a relatively high pressure loss on the fluid which is circulating and they can therefore be arranged in several ways.

Figure 5:
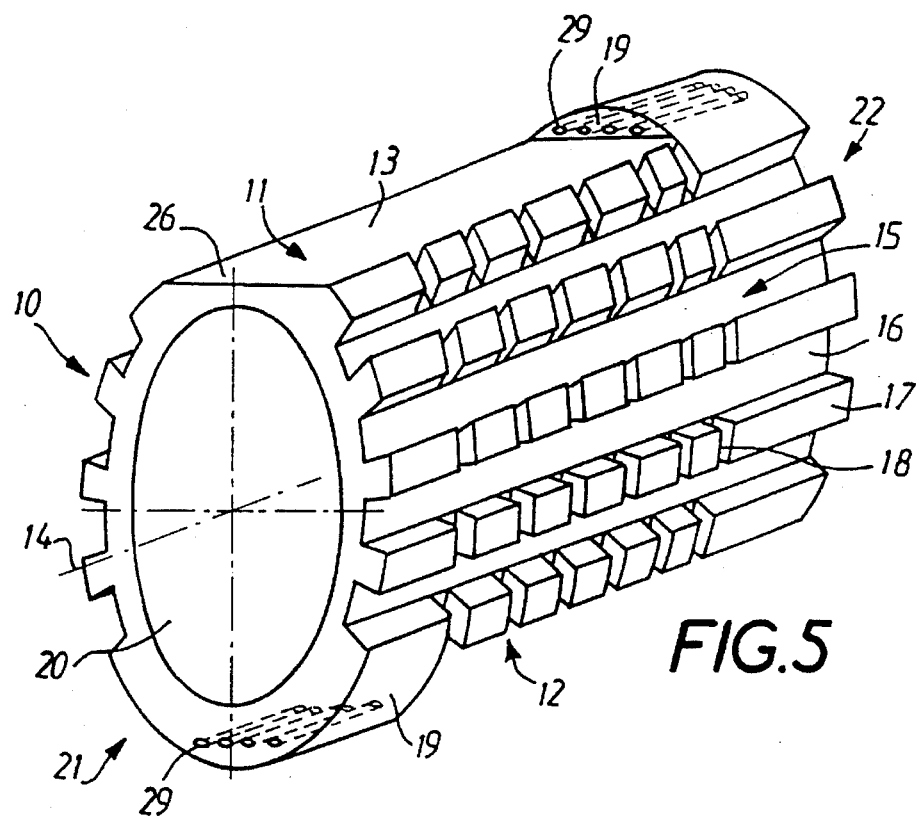
FIG. 5 is a perspective of a preferred form of arrangement of the insert equipping the valve according to the invention.

FIG. 5 shows a version where the said resistors 15 are comprised of several longitudinal grooves 16 which are connected by transversal slots 18 in the ribs 17 defined at the periphery of the said cylindrically sectors by the grooves 16. According to another form of arrangement, the tranversal slots 18 can be replaced by transversal orifices running through these ribs 17. However, this arrangement (not shown) presents machining difficulties.

The inlet chamber 11 is open on the inlet side 21 of the insert 10 and partially closed on its outlet side 22. The outlet chamber is partially closed on the inlet side 21 of the insert 10 and open on its outlet side 22. These chambers can be defined in different ways according to the way the insert 10 is implemented.

In the case of FIG. 5, the two longitudinal recesses 13 are open and defined by a longitudinal flat part 26 at the periphery of the insert 10. Each chamber 11, 12 is then defined outwards by a sector of the internal wall of the channel 6 running through the ball 4 or the plug 5 and a end collar 19 partially closing the chamber on the side opposite its opening. This end collar 19 comprises axial conduits 29 allowing self-cleaning of the valve when it is in the open position and the fluid is full of impurities. This arrangement is not obligatory if the fluid is clear.

Figures 7, 8:
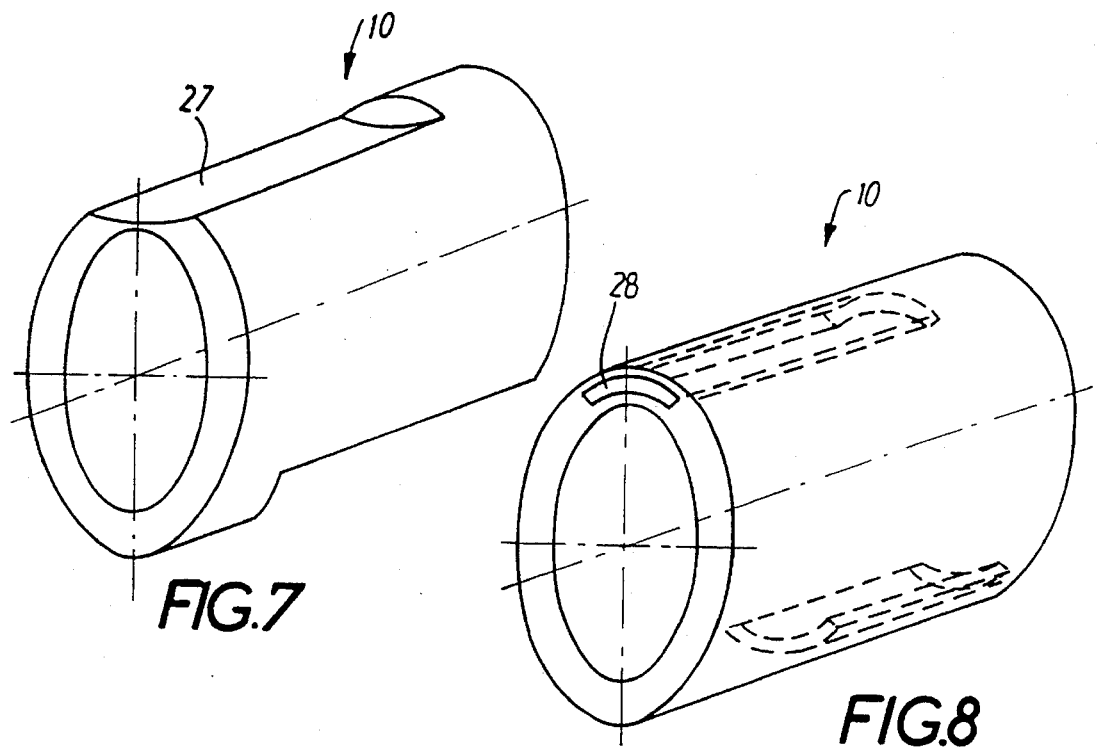
FIGS. 7 and 8 show schematic perspectives of other forms of arrangement of the insert.
Figure 9:
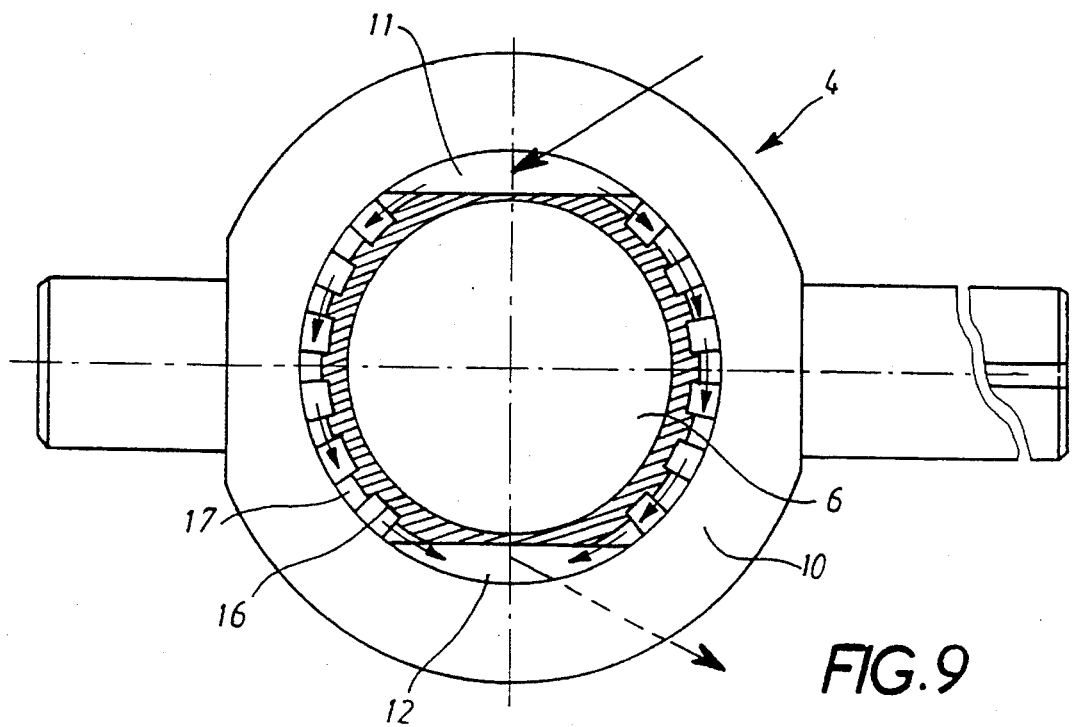
FIG. 9 is a plan view of a ball equipping a valve according to the invention, illustrating the flow path.

In the form of arrangement illustrated by FIG. 7, chambers 11, 12 are defined outwards by a cylindrical surface 27 which is coaxial with the insert's axis. In the example shown, this cylindrical surface is concave but it could of course be convex.

In the form of arrangement illustrated by FIG. 8, the recess 13 is closed outwards and each chamber 11, 12 is then comprised of a blind cavity 28 in the wall of the insert 10. This type of insert allows a version with two complementary parts which are then assembled together.

Figure 4:
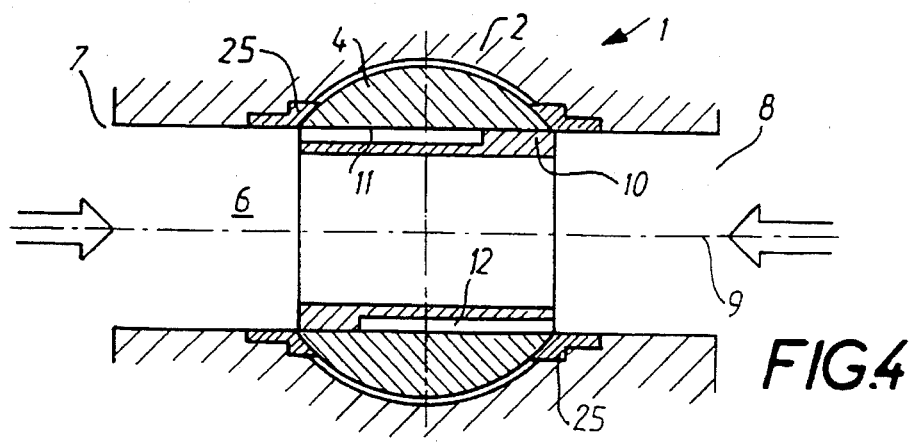
FIG. 4 is a longitudinal cutaway view of a second form of arrangement of a ball valve according to the invention in the open position.

In all the forms of arrangement described, the insert has a substantially cylindrical middle channel 20. This channel's diameter can be smaller than the diameter of the inlet 7 and outlet 8 chambers, as shown in figure 4 or equal to this diameter as shown in FIG. 5.

Figure 6:
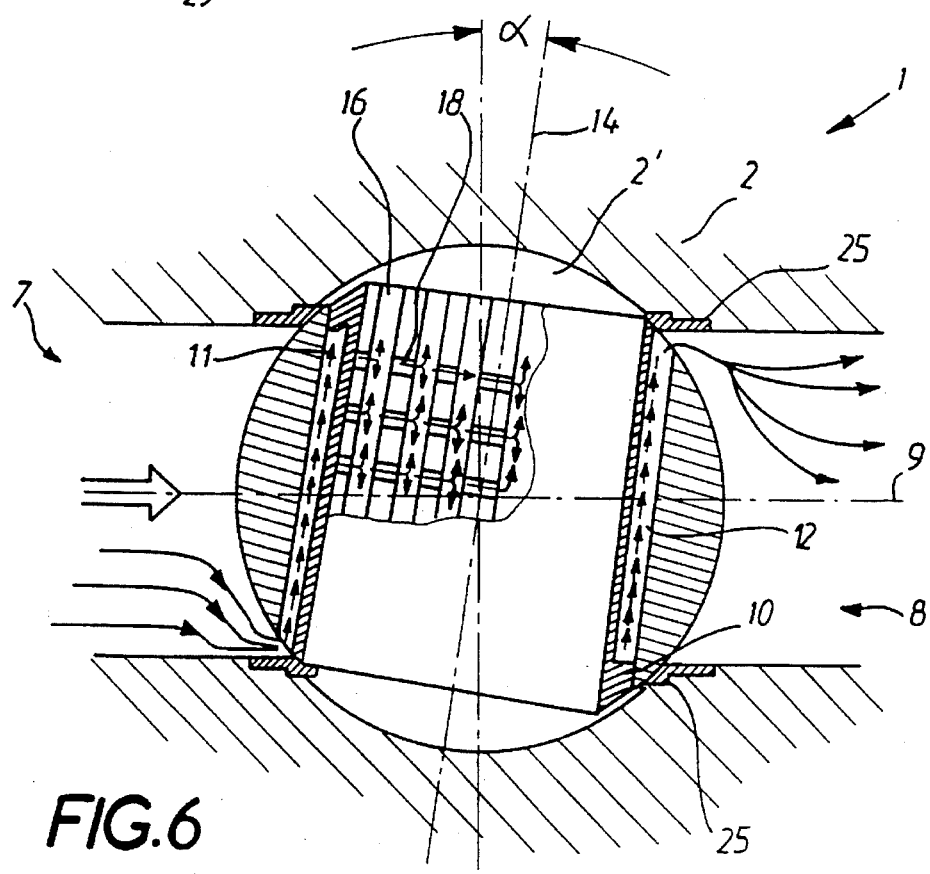
FIG. 6 is a partial cutaway view of a ball valve according to the invention, illustrating the flow path.

When the valve 1 is in the open position, the axis 14 of the channel 6 is perpendicular to the axis 9 of the inlet 7 and outlet 8 conduits. The valve's movable member 3, consisting of the ball 4 or the plug 5, is in contact with the seats 25 provided in the housing 2' of the body 2, thus ensuring the valve tightness. To open the valve 1, the user turns the control handwheel 23. The movable member 3 turns in its housing 2'. From a rotating angle , illustrated by FIG. 6, which is an acute angle whose value depends on the diameter of the channel 6, the fluid circulating in the inlet conduit can enter the inlet chamber 11. Under the effect of the inlet pressure, this fluid is forced as far as the outlet chamber 12, through the resistors 15 which create an extremely disturbed radial flow, generating a significant pressure loss. This pressure loss has the effect of reducing the differential pressure between the valve's inlet and outlet and thus considerably reduces the local velocities on the valve's seats, which diminishes the seat erosion and noise. When the valve is fully open, the insert 10 no longer obstructs the flow of the fluid in any way and what is more it is a self-cleaning passage.

This operation is repeated when the valve is closing.

The insert 10 as described above can equip all kinds of ball or plug valves intended to be mounted on fluid supply conduits with a full or reduced diameter. This insert's 10 symmetrical design also means that a fluid moving in both directions can be used and the presence of the insert, whose role it is to create the instantaneous pressure of the fluid drop during a certain phase when the valve is opening, makes it possible to use ball valves on high fluid pressure circuits. Indeed, standard ball valves were generally used on low differential pressure circuits for the reasons mentioned in the introduction.

This invention is not restricted to the example described above, but can be widened to include any modification or variation which is obvious for the expert.

We claim:

1. A valve comprising:

a housing having an inlet and an outlet, and a flow passage extending from said inlet to said outlet;

a closure member disposed in said housing, said closure member movable between open and closed positions, wherein in said closed position said closure member blocks said flow passage;

a valve stem connected to said closure member for moving said closure member between said open and closed positions, said valve stem having an axis extending perpendicular to said flow passage;

an insert member connected to said closure member, said insert member including an insert flow passage extending therethrough such that said inlet and said outlet of said housing are in communication by way of said insert flow passage when said closure member is in said open position, and when said closure member is in said open position at least a majority of flow through said valve passes through said insert flow passage;

said insert member including an inlet chamber portion disposed on an exterior of said insert member, said inlet chamber portion having an opening disposed on an inlet side of said insert member when said closure member is in the open position and wherein said inlet chamber portion is disposed such that during movement of said closure member from said closed position to said open position flow initially enters said opening of said inlet chamber portion prior to flow entering said insert flow passage;

said insert member further including an outlet chamber portion disposed on an exterior of said insert member, said outlet chamber portion having an opening disposed on an outlet side of said insert member when said closure member is in said open position; and wherein said inlet chamber portion and said outlet chamber portion communicate with each other along exterior surfaces of said insert member, and wherein said exterior surfaces are exterior surfaces of a wall of said insert member, and further wherein said wall separates said inlet chamber portion and said outlet chamber portion from said insert flow passage.

2. The valve of claim 1, wherein said insert member is a tubular member having said inlet chamber portion and said outlet chamber portion disposed on exterior surfaces thereof, said insert member further including an inlet chamber end collar at least partially closing said inlet chamber portion at an outlet side of said insert member when said closure member is in said open position, said insert member further including an outlet chamber end collar at least partially closing said outlet chamber portion at an inlet side of said insert member when said closure member is in said open position.

3. The valve of claim 2, wherein said inlet chamber portion and said outlet chamber portion are located at diametrically opposed positions of said tubular member and communicate circumferentially about said tubular member.

4. The valve of claim 3, further including a baffle structure disposed along a circumferential communication path between said inlet chamber portion and said outlet chamber portion.

5. The valve of claim 4, wherein said baffle structure includes a plurality of ribs extending in a longitudinal direction of said tubular member on an exterior portion of said tubular member.

6. The valve of claim 5, wherein said ribs include openings extending in a circumferential direction of said tubular member.

7. The valve of claim 2, further including a plurality of openings extending through said inlet chamber end collar and extending in a longitudinal direction with respect to said tubular member, the valve further including a plurality of openings extending through said outlet chamber end collar and extending in said longitudinal direction.

8. The valve of claim 2, wherein said closure member is a ball valve closure member having a cylindrical bore therein, and wherein said insert member is disposed in said cylindrical bore.

9. The valve of claim 1, wherein said closure member is a ball valve closure member having a cylindrical bore therein, and wherein said insert member is disposed in said cylindrical bore.

10. The valve of claim 1, wherein said insert member is a tubular member having a tubular wall, and wherein said opening of said inlet chamber portion in an opening disposed in said tubular wall, and said opening of said outlet chamber portion is an opening disposed in said tubular wall.

11. The valve of claim 1, wherein said opening of said inlet chamber portion extends along a first circumferential portion of said insert member, and said opening of said outlet chamber portion extends a second circumferential portion of said insert member which is diametrically opposed to said first circumferential portion.

12. The valve of claim 1, wherein, when viewed in a direction along the flow passage when the closure member is in the open position, said opening of said inlet chamber portion includes a shape having a first side which is arcuate and a second side which is one of arcuate and flat.

13. The valve of claim 1, wherein an inlet opening of said insert flow passage is of a same size as an inlet opening of said housing.

14. A valve comprising:

a housing having an inlet and an outlet, and a flow passage extending from said inlet to said outlet;

a closure member disposed in said housing, said closure member movable between fully open and fully closed positions, wherein in said fully closed position said closure member blocks said flow passage;

a valve stem connected to said closure member for moving said closure member between said fully open and fully closed positions, said valve stem having an axis extending perpendicular to said flow passage;

a tubular member connected to said closure member, said tubular member including a tubular wall defining a tubular member flow passage therethrough such that said inlet and said outlet of said housing are in communication by way of said tubular member flow passage when said closure member is in said fully open position, and a majority of flow through said valve passes through said tubular member flow passage when said closure member is in said fully open position;

said tubular wall including an inlet chamber portion and an outlet chamber portion separated from said tubular member flow passage by said tubular wall, wherein said inlet chamber portion includes an opening disposed at an inlet side of said tubular member when said closure member is in said fully open position, and wherein said opening of said inlet chamber portion opens into and is in communication with said inlet of said housing when said closure member is in the fully open position such that flow enters both said opening of said inlet chamber and said tubular member flow passage when said closure member is in the fully open position, said outlet chamber portion having an opening disposed at an outlet side of said tubular member when said closure member is in said open position, and wherein said opening of said outlet chamber portion opens into and is in communication with said outlet of said housing when the closure member is in the fully. Open position such that flow exits both said opening of said outlet chamber and said tubular member flow passage when said closure member is in the fully open position;

said tubular member further including an inlet chamber end collar which at least partially closes an outlet side of said inlet chamber portion, and an outlet chamber end collar which at least partially closes an inlet side of said outlet chamber portion; and the valve further including a circumferential communication path extending about said tubular wall such that said inlet chamber portion and said outlet chamber portion communicate with one another by way of said circumferential communication path.

15. The valve of claim 14, wherein said closure member is a ball valve closure member having a cylindrical flow passage extending therethrough, and wherein said tubular member is disposed in said cylindrical flow passage, and further wherein said circumferential flow path is defined between an exterior surface of said tubular member and an interior surface of said cylindrical flow passage of said ball valve closure member.

16. The valve of claim 14, wherein said inlet chamber portion includes an opening extending from an inlet end wall portion of said tubular wall, and said outlet chamber portion includes an opening extending from an outlet end wall portion of said tubular wall.

17. The valve of claim 14, further including a baffle structure disposed along said circumferential flow path.

18. The valve of claim 17, wherein said baffle structure includes a plurality of ribs extending in a longitudinal direction of said tubular member, and wherein said plurality of ribs include a plurality of openings extending in a circumferential direction.

19. The valve of claim 14, wherein said closure member is a ball valve closure member having a cylindrical bore therein, and wherein said tubular member is disposed in said cylindrical bore, and further wherein an inlet chamber is defined between said inlet chamber portion of said tubular member and the cylindrical bore of said ball valve closure member, and an outlet chamber is defined between said cylindrical bore and said outlet chamber portion of said tubular member.

20. The valve of claim 19, wherein said inlet chamber end collar is in sealing contact with an interior surface of said cylindrical bore of said ball valve closure member, and said outlet chamber end collar is in sealing contact with the interior surface of said cylindrical bore of said ball valve closure member.

21. The valve of claim 14, wherein said opening of said inlet chamber portion extends along a first circumferential portion of said tubular member, and said opening of said outlet chamber portion extends along a second circumferential portion of said tubular member which is diametrically opposed to first circumferential portion.

22. The valve of claim 14, wherein, when viewed in a direction along the flow passage when the closure member is in the fully open position, said opening of said inlet chamber portion includes a shape having a first side which is arcuate and a second side which is one of arcuate and flat.

23. The valve of claim 14, wherein an inlet opening of said tubular member flow passage is of a same size as an inlet opening of said housing.

24. A valve comprising:
   a housing having an inlet and an outlet, and a flow passage extending from said inlet to said outlet;
   a closure member disposed in said housing, said closure member movable between open and closed positions, wherein in said closed position said closure member blocks said flow passage;
   a valve stem connected to said closure member for moving said closure member between said open and closed positions, said valve stem having an axis extending perpendicular to said flow passage;
   a tubular member connected to said closure member and having tubular wall portions defining a tubular member flow passage therethrough such that said inlet and said outlet of said housing are in communication by way of said tubular member flow passage when said closure member is in said open position, and when said closure member is in said open position at least a majority of flow through said valve passes through said tubular member flow passage;
   an inlet chamber disposed between said tubular wall portions and said closure member, said inlet chamber including an opening disposed at an inlet side of said tubular member when said closure member is in said open position;
   an outlet chamber disposed between said tubular wall portions and said closure member, said outlet chamber including an opening disposed at an outlet side of said tubular member when said closure member is in said open position;
   wherein said inlet chamber and said outlet chamber are separated from said tubular member flow passage by said tubular wall portions, and wherein said inlet chamber and said outlet chamber are disposed at diametrically opposed positions of said tubular member, and further wherein a circumferential flow path extends about said tubular wall portions, said circumferential flow path extending from said inlet chamber to said outlet chamber such that said inlet chamber communicates with said outlet chamber by way of said circumferential flow path; and
   a plurality of baffles disposed in said circumferential flow path.

25. The valve of claim 24, further including an inlet chamber end collar disposed on an outlet side of said inlet chamber when said closure member is in the open position, and an outlet chamber end collar disposed on an inlet side of said outlet chamber when said closure member is in said open position.

26. The valve of claim 24, wherein said opening of said inlet chamber portion extends along a first circumferential portion of said tubular member, and said opening of said outlet chamber portion extends along a second circumferential portion of said tubular member which is diametrically opposed to first circumferential portion.

27. The valve of claim 24, wherein, when viewed in a direction along the flow passage when the closure member is in the open position, said opening of said inlet chamber has a shape having a first side which is arcuate and a second side which is one of arcuate and flat.

28. The valve of claim 24, wherein an inlet opening of said tubular member flow passage is of a same size as an inlet opening of said housing.

* * * * *

UNITED STATES PATENT AND TRADEMARK OFFICE
CERTIFICATE OF CORRECTION

PATENT NO. : 5,509,446
DATED : April 23, 1996
INVENTOR(S) : ROGER BEY

It is certified that error appears in the above-indentified patent and that said Letters Patent is hereby corrected as shown below:

```
In column 1, line 21, change "are-" to --are--.
In column 3, line 18, change "1S" to --15--;
    line 42, change "a" to --an--
In column 6, line 37, delete the period;
    line 38, change "Open" to --open--.
```

Signed and Sealed this

Fifth Day of August, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,509,446

DATED : April 23, 1996

INVENTOR(S) : Roger BEY

It is certified that error appears in the above-identified patent and that said Letters Patent is hereby corrected as shown below:

On the title page, Items [86], and [87], the PCT information, should be deleted. Item [22] should read:

--[22]  Filing Date:  May 17, 1995--

[63] after "abandoned" but before the period should read --, which was filed as PCT application PCT/FR93/00673, July 2, 1993.--

Signed and Sealed this

Twenty-eighth Day of April, 1998

*Attest:*

BRUCE LEHMAN

*Attesting Officer*  *Commissioner of Patents and Trademarks*